(12) United States Patent
Miyata

(10) Patent No.: US 9,142,202 B2
(45) Date of Patent: Sep. 22, 2015

(54) ELECTRONIC PERCUSSION PAD AND METHOD OF MANUFACTURING ELECTRONIC PERCUSSION PAD

(71) Applicant: Yamaha Corporation, Hamamatsu-Shi, Shizuoka-Ken (JP)

(72) Inventor: Tomoya Miyata, Hamamatsu (JP)

(73) Assignee: Yamaha Corporation, Hamamatsu (JP)

( * ) Notice: Subject to any disclaimer, the term of this patent is extended or adjusted under 35 U.S.C. 154(b) by 0 days.

(21) Appl. No.: 14/459,663

(22) Filed: Aug. 14, 2014

(65) Prior Publication Data

US 2015/0053070 A1  Feb. 26, 2015

(30) Foreign Application Priority Data

Aug. 20, 2013  (JP) .................... 2013-170452

(51) Int. Cl.
| | |
|---|---|
| *G10H 1/32* | (2006.01) |
| *G10H 3/00* | (2006.01) |
| *G10H 3/14* | (2006.01) |
| *B29C 44/12* | (2006.01) |
| *G10D 13/02* | (2006.01) |
| *B29K 75/00* | (2006.01) |
| *B29L 7/00* | (2006.01) |
| *B29K 105/04* | (2006.01) |
| *B29L 9/00* | (2006.01) |

(52) U.S. Cl.
CPC ............. *G10H 1/32* (2013.01); *B29C 44/1271* (2013.01); *G10D 13/024* (2013.01); *G10H 3/146* (2013.01); *B29K 2075/00* (2013.01); *B29K 2105/04* (2013.01); *B29L 2007/00* (2013.01); *B29L 2009/00* (2013.01); *G10H 2230/275* (2013.01)

(58) Field of Classification Search
CPC .  G10D 13/024; G10D 13/029; G10D 13/027; G10H 3/146; G10H 2230/275
USPC ................................ 84/421, 743
See application file for complete search history.

(56) References Cited

U.S. PATENT DOCUMENTS

| 5,009,146 | A | * | 4/1991 | Manabe et al. ................ 84/615 |
| 5,585,581 | A | * | 12/1996 | Rogers ............................ 84/414 |
| 6,297,177 | B1 | * | 10/2001 | Belli et al. ................... 442/242 |
| 6,365,812 | B1 | * | 4/2002 | McGill .......................... 84/414 |
| 2009/0241754 | A1 | * | 10/2009 | Okada et al. ................... 84/414 |

FOREIGN PATENT DOCUMENTS

| JP | 2003-295864 A | 10/2003 |
| JP | 2010-262167 A | 11/2010 |

* cited by examiner

*Primary Examiner* — Jeffrey Donels
(74) *Attorney, Agent, or Firm* — Dickstein Shapiro LLP

(57) ABSTRACT

An electronic percussion pad includes a pad layer and a holding layer that holds this pad layer from a back surface thereof, in which the pad layer is formed of polyurethane foam laminated on a front surface of the holding layer. This pad layer is directly bonded to the holding layer by allowing a polyurethane foam composition, which is supplied to one surface of the holding layer, to foam and be cured.

19 Claims, 4 Drawing Sheets

US 9,142,202 B2

ELECTRONIC PERCUSSION PAD AND METHOD OF MANUFACTURING ELECTRONIC PERCUSSION PAD

BACKGROUND OF THE INVENTION

1. Field of the Invention

The present invention relates to an electronic percussion pad and a method of manufacturing an electronic percussion pad.

Priority is claimed on Japanese Patent Application No. 2013-170452, filed on Aug. 20, 2013, the content of which is incorporated herein by reference.

2. Description of Related Art

As an electronic percussion pad, a drum pad used in an electronic percussion, which detects a strike on a striking surface with a sensor and generates an electronic sound close to a sound of a natural percussion instrument, is known. As such a drum pad, there is one known including: a rubber pad layer that includes a striking surface on a front surface thereof; a metal holding layer that holds the pad layer from a back surface thereof; and a sensor that is disposed on a back surface of the holding layer (for example, refer to Japanese Unexamined Patent Application, First Publication No. 2003-295864 and Japanese Unexamined Patent Application, First Publication No. 2010-262167).

In this drum pad, when the striking surface of the pad layer is struck, the pad layer vibrates, and this vibration is transmitted to the sensor through the holding layer. The sensor detects this vibration, and an electronic sound is generated based on a strike detection signal output from the sensor.

However, in the above-described drum pad of the related art, an adhesive layer is disposed between the pad layer and the holding layer such that the pad layer and the holding layer are bonded to each other by an adhesive. In order to bond the rubber pad layer and the metal holding layer to each other with a sufficient strength, a special adhesive is necessary, and it takes sufficient time to bond the rubber pad layer and the metal holding layer to each other.

In the drum pad disclosed in Japanese Unexamined Patent Application, First Publication No. 2010-262167, a surface of the pad layer to which the holding layer is bonded is formed as a composite layer to improve the bond strength of the adhesive layer between the pad layer and the holding layer. In order to manufacture this drum pad, a process of forming the composite layer is necessary.

In addition, in the drum pad of the related art, vibration of the pad layer generated by a strike is transmitted to the holding layer through the adhesive layer and the composite layer and then is transmitted to the sensor disposed on the back surface of the holding layer. Accordingly, the detection time of the sensor is delayed by the time during which the vibration is transmitted to the adhesive layer and the like.

SUMMARY OF THE INVENTION

The present invention has been made in consideration of the above-described circumstances. An object of the present invention is to provide an electronic percussion pad with high-sensitivity and a method of manufacturing the same, in which a satisfactory bonding state between a pad layer and a holding layer is easily and reliably obtained.

According to an aspect of the present invention, there is provided an electronic percussion pad including: a pad layer that includes a striking surface on a front surface of the pad layer; and a holding layer that holds a back surface of the pad layer, in which the pad layer is formed of polyurethane foam laminated on a front surface of the holding layer.

In this electronic percussion pad, the pad layer is formed of polyurethane foam laminated on the front surface of the holding layer. Therefore, when the pad layer is laminated on the front surface of the holding layer, a satisfactory bonding state between the pad layer and the holding layer can be easily and reliably obtained using a foam pressure of the polyurethane foam. That is, by allowing the polyurethane foam composition to foam and be cured on the front surface of the holding layer, the pad layer is formed on the surface of the holding layer, and a bonding state between the pad layer and the holding layer is obtained by foam pressure.

In addition, unlike as in the related art, this electronic percussion pad does not include an adhesive layer. For example, when the sensor is disposed on the back surface of the holding layer, an adhesive layer is not present during the transmission of a strike to this sensor, and the sensitivity of the sensor can therefore be improved.

According to another aspect of the present invention, there is provided a method for manufacturing an electronic percussion pad, the method including the steps of: supplying a polyurethane foam composition to molding dies disposed on one surface of a holding layer; sealing the molding dies to obtain a predetermined capacity; and forming a pad layer, which is bonded to the holding layer, by causing the polyurethane foam composition to foam so as to expand and be cured in the sealed molding die.

According to the method of manufacturing an electronic percussion pad, a satisfactory bonding state between the pad layer and the holding layer can be easily and reliably obtained using a foam pressure of the polyurethane foam. Accordingly, an electronic percussion pad in which the pad layer is formed of polyurethane foam laminated on the front surface of the holding layer can be easily and reliably manufactured.

As described above, with the electronic percussion pad according to the present invention, a satisfactory bonding state between the pad layer and the holding layer is easily and reliably obtained. Accordingly, when the sensor is attached to this electronic percussion pad, an electronic percussion with high-sensitivity can be obtained.

DETAILED DESCRIPTION OF THE INVENTION

Hereinafter, an embodiment of the present invention will be described with reference to the accompanying drawings.

Hereinafter, as an electronic percussion pad according to the present invention, an electronic drum is used, and a drum pad which is struck by a stick or the like will be described as an example. The electronic percussion pad according to the present invention is not limited to the drum pad and can be applied to other percussion input devices.

[Drum Pad]

Figure 1:
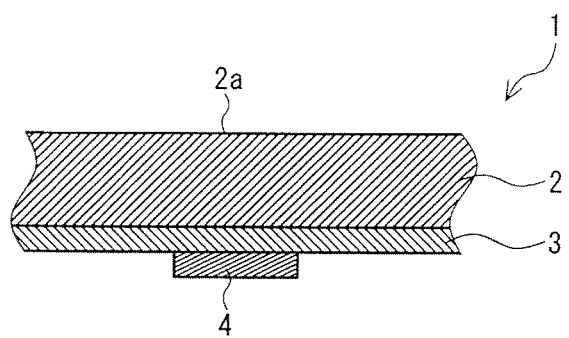
FIG. 1 is a cross-sectional view showing a drum pad according to an embodiment of the present invention.

Referring to FIG. 1, a drum pad 1 includes: a pad layer 2 that includes a striking surface 2a on a front surface thereof; a holding layer 3 that holds a back surface of the pad layer 2; and a sensor 4 that detects a strike on the striking surface 2a. "Front surfaces" of the pad layer 2, the holding layer 3, and the like refer to upper surfaces in FIG. 1, and "back surfaces" thereof refers to lower surfaces in FIG. 1.

This drum pad 1 is assumed to be used in, for example, 10 to 14-inch long snare and tom-tom drums of an electronic drum kit and specifically has, for example, a diameter of 200 mm to 300 mm and a thickness of 10 mm to 30 mm. In addition, the drum pad 1 may include a cylindrical shell (drum barrel) that surrounds a periphery of the pad layer 2, and this shell may include a rim at a front-side end portion thereof. The size, the use, and the like of the drum pad 1 are not limited to those described above.

The pad layer 2 is laminated on the front surface of the holding layer 3. Other layers are not present between the holding layer 3 and the pad layer 2, and the pad layer 2 is directly laminated on the front surface of the holding layer 3.

The sensor 4 is attached to the back surface of the holding layer 3, and a strike on the striking surface 2a can be detected by the sensor 4. The sensor 4 is bonded to the back surface of the holding layer 3 by an adhesive.

A vibration absorbing material may be interposed between the sensor 4 and the back surface of the holding layer 3, or the sensor 4 may be supported by the holding layer 3 to be hollow. In addition, an installation position of the sensor 4 is not particularly limited, but it is preferable that the sensor 4 be attached to the center of a plane of the holding layer 3. As the adhesive, for example, a reactive adhesive may be used. However, the adhesive is not particularly limited as long as it can bond to the sensor 4.

This sensor 4 detects a strike on the striking surface 2a and outputs a strike detection signal from a signal output line (not shown) to an electronic sound source (not shown). As the sensor 4, for example, a piezoelectric element or a sound collecting microphone may be used. However, the sensor 4 is not particularly limited as long as it can detect a strike on the striking surface 2a.

The holding layer 3 is formed of a planar disk in the embodiment. As a material of the holding layer 3, for example, a metal plate such as an iron plate, a steel sheet, a galvanized steel sheet, or an aluminum plate may be used. However, the material of the holding layer 3 is not particularly limited. The average thickness of the holding layer 3 is, for example, 0.5 mm to 3 mm, but is not limited thereto.

The pad layer 2 is formed of polyurethane foam. The pad layer 2 and the holding layer 3 are bonded to each other by a foaming pressure of the polyurethane foam. Specifically, a bonding state between the pad layer 2 and the holding layer 3 is obtained by allowing the polyurethane foam composition (holding layer-forming material) to foam and be cured on the front surface of the holding layer 3. The average thickness of the pad layer 2 is, for example, 5 mm to 20 mm, but is not limited thereto.

The polyurethane foam composition is not particularly limited as long as it can form polyurethane foam, and a well-known material is used. Specifically, as the polyurethane foam composition, for example, a composition containing polyol, isocyanate, and a foaming agent is used. This polyurethane foam composition may optionally contain various additives such as a curing agent, a colorant, a light stabilizer, a thermal stabilizer, an antioxidant, an anti-fungal agent, and a flame retardant within a range in which the properties of the pad layer 2 do not deteriorate.

The polyol is not particularly limited as long as it can form a urethane bond with isocyanate, and examples thereof include polyether polyol, polyester polyol, polycarbonate polyol, and polycaprolactone polyol.

The number average molecular weight of the polyol is preferably from 200 to 10000. When the number average molecular weight is less than the lower limit, the reaction rapidly progresses, and desirable molding is difficult to perform. In addition, the flexibility of the pad layer 2 may be insufficient. On the other hand, when the number average molecular weight is greater than the upper limit, the viscosity of the polyurethane foam composition is excessively high, and molding is difficult to perform.

The isocyanate is not particularly limited as long as it can form a urethane bond with polyol, and examples thereof include tolylene diisocyanate, diphenyl methane diisocyanate, and hexamethylene diisocyanate.

The foaming agent is not particularly limited as long as it can foam during the molding of the pad layer 2, and examples thereof include a thermally decomposable foaming agent that foams due to heat. As this thermally decomposable foaming agent, for example, a hydrazine-based foaming agent such as oxy-bis-benzene-sulfonyl hydrazide (OBSH) or p-toluene-sulfonyl hydrazide; and an azo-based foaming agent such as azodicarbonamide (ADCA) or azobisformamide may be used. The decomposition temperature of the thermally decomposable foaming agent is preferably 100° C. to 240° C. in consideration of the ease of the molding of the pad layer 2.

The lower limit of the expansion ratio of the pad layer 2 (polyurethane foam) is preferably 1.2 times and more preferably 1.5 times. The expansion ratio refers to a value (volume after free-foaming/volume of molded product) obtained by dividing the volume of a pad layer-forming material after foaming, which is obtained on the assumption that the liquid pad layer-forming material foams under atmospheric pressure, by the volume of the pad layer which is actually molded. On the other hand, the upper limit of the expansion ratio is preferably 5.5 times and more preferably 2.5 times. When the expansion ratio is less than the lower limit, the foam pressure is excessively low, and thus the bond strength between the pad layer 2 and the holding layer 3 may be weakened. Conversely, when the expansion ratio is greater than the upper limit, the internal pressure of the molding dies is excessively high, the molding dies cannot endure the pressure, and the pad layer 2 cannot be molded. In addition, it is expensive to manufacture molding dies that can endure the pressure.

The lower limit of the porosity of the pad layer 2 (polyurethane foam) is preferably 30% and more preferably 40%. On the other hand, the upper limit of the porosity is preferably 80% and more preferably 70%. When the porosity is less than the lower limit, the pad layer 2 is excessively hard, and a desirable striking feel may not be obtained. Conversely, when the porosity is greater than the upper limit, the pad layer 2 is excessively flexible, and the strength thereof may be insufficient for a strike. "The porosity" can be calculated from (specific gravity of resin-apparent density)×100. The apparent density can be calculated according to "Method of Obtaining Plastic Foam and Rubber-apparent Density" of JIS K 7222.

The lower limit of the hardness (Asker C hardness) of the pad layer 2 is preferably 10 and more preferably 30. On the other hand, the upper limit of the hardness is preferably 60 and more preferably 50. When the hardness is less than the lower limit, the pad layer 2 is excessively flexible, and a desirable striking feel may not be obtained. Conversely, when the hardness is greater than the upper limit, the pad layer 2 is excessively hard, and a desirable striking feel may not be obtained. The hardness is a value measured according to Asker C hardness of JIS K 7312.

The lower limit of the peel strength of the pad layer 2 and the holding layer 3 is preferably 5 N/25 mm and more preferably 7 N/25 mm. When the peel strength is less than the lower limit, the bonding state between the pad layer 2 and the holding layer 3 is insufficient, and thus the pad layer 2 and the holding layer 3 may be carelessly peeled from each other. The peel strength is a value measured according to JIS K 6854-1.

[Method of Manufacturing Drum Pad]

Next, a method of manufacturing the drum pad 1 will be described.

The method of manufacturing the drum pad 1 includes: a polyurethane foam composition supply process of supplying a polyurethane foam composition to one surface of the holding layer 3; a foaming and curing process of allowing this polyurethane foam composition to foam and be cured; and a sensor attaching process of attaching the sensor 4 to the other surface of the holding layer 3.

Figure 2:
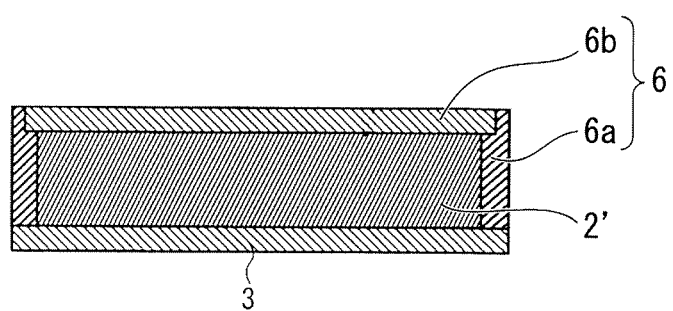
FIG. 2 is a cross-sectional view showing a process of a method of manufacturing the drum pad of FIG. 1.

In the polyurethane foam composition supply process, as shown in FIG. 2, a cylindrical frame member 6a, which is included in molding dies 6 for forming a pad layer on the front surface of the holding layer 3, is brought into close contact with the front surface of the holding layer 3 to supply a liquid polyurethane foam composition 2' thereto. Next, an opening of the cylindrical frame member 6a is closed with a disk-shaped cover 6b to seal the inside of the molding dies 6.

FIG. 2 shows an example in which the holding layer 3 functions as the bottom of the molding dies 6. However, the holding layer 3 may be disposed to function as a cover of the molding dies 6.

In the foaming and curing process, the polyurethane foam composition 2' in the molding dies 6 foams by, for example, heating or the like to tend to expand to a volume greater than the capacity of the molding dies 6 and is cured by polymerization between polyol and isocyanate, thereby forming the pad layer 2. In this process, by air-tightly sealing the molding dies 6, the holding layer 3 and the pad layer 2 are bonded to each other by a foam pressure of the polyurethane foam.

In this foaming and curing process, the internal pressure (foam pressure) of the molding dies 6 is preferably 1.2 kgf/cm² to 5.5 kgf/cm².

When the internal pressure is less than the lower limit, the sufficient bonding between the pad layer 2 and the holding layer 3 may not be obtained. Conversely, when the internal pressure is higher than the upper limit, it is expensive to manufacture molding dies that can endure the pressure, which leads to an increase in manufacturing costs.

The sensor attaching process may be performed after the foaming and curing process or before the polyurethane foam composition supply process.

Advantageous Effects

In the drum pad 1 obtained as above, other layers are not present between the pad layer 2 and the holding layer 3, and the pad layer 2 is directly laminated on the front surface of the holding layer 3. Accordingly, unlike as in the related art, it is not necessary to provide an adhesive between the pad layer 2 and the holding layer 3, and a satisfactory bonding state between the pad layer 2 and the holding layer 3 can be easily and reliably obtained using a foam pressure of the polyurethane foam. As a result, the manufacturing costs can be reduced.

Further, since the drum pad 1 does not include an adhesive layer between the pad layer 2 and the holding layer 3, the detection time of the sensor 4 is not delayed by the adhesive layer provided between the pad layer 2 and the holding layer 3. Accordingly, the sensitivity of the sensor 4 to a strike on the pad layer 2 is superior.

Other Embodiments

The present invention is not limited to the above-described embodiment, and various design changes can be made within the scope of the present invention.

In the description of the above-described embodiment, the holding layer 3 is a plate-like disk, but the present invention is not limited thereto. The holding layer may have a shape shown in FIG. 3. In a drum pad 11 of FIG. 3, a holding layer 13 includes, for example, a plate-like holding layer main body 13a and a convex portion 13b that protrudes from the holding layer main body 13a toward the front surface of the holding layer 13. In this drum pad 11, a pad layer 12 and the holding layer 13 are bonded to each other using a foam pressure of the urethane foam. Therefore, even when the holding layer 13 having a complex shape is used, a satisfactory bonding state between the pad layer 12 and the holding layer 13 can be easily and reliably obtained. Further, by the holding layer 13 including the convex portion 13b that protrudes from the holding layer main body 13a, the contact area between the holding layer 13 and the pad layer 12 is increased, and thus the bonding therebetween can be further strengthened.

The shape or the like of the convex portion 13b is not particularly limited. However, by forming the convex portion 13b in a rib shape, the strength of the holding layer 13 itself can be improved.

Figure 3:
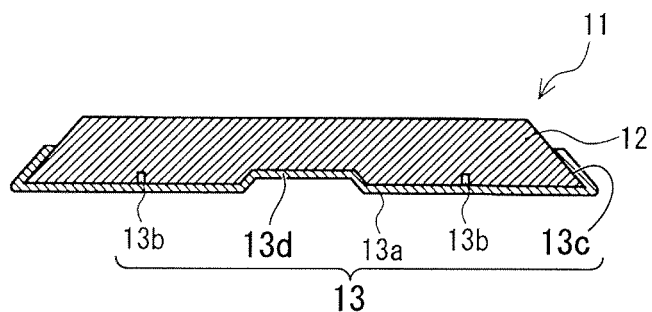
FIG. 3 is a cross-sectional view showing a drum pad according to another embodiment of the present invention.

The convex portion 13b may be a notch. A notch can be formed at a low cost by pressing one plate which is to form a holding layer. In FIG. 3, a convex portion is formed on the front surface (upper surface) of the holding layer main body 13a and a concave portion is formed on the back surface (lower surface) thereof. However, a concave portion may be formed on the front surface of the holding layer main body 13a and a convex portion may be formed on the back surface thereof such that the contact area with the pad layer 12 can be increased by the concave portion. That is, it is preferable that a surface of the holding layer 13 to which the pad layer 12 is bonded include a convex portion or a concave portion.

The holding layer main body 13a of FIG. 3 includes a portion 13c whose periphery rises toward the front surface. In addition, a portion 13d that is curved and swells toward the front surface is formed in the center of the holding layer main body 3a.

The holding layer 13 may have a bowl shape having a curved surface in which the entire holding layer is convex or concave; a conical shape; or a combination thereof. These shapes can be formed at a low cost by pressing one plate. Further, the holding layer may be formed by combining a plurality of molded plates using a well-known technique.

The holding layer may have a complex shape formed of a metal plate. In addition, since the pad layer formed of polyurethane foam has high bond strength with metal, it is preferable that a metal plate be used for the holding layer.

As described above, it is preferable that the holding layer include a plate-like holding layer main body and a convex portion that protrudes from the holding layer main body toward the front surface of the holding layer. By the holding layer including the convex portion that protrudes from the holding layer main body as described above, the contact area between the holding layer and the pad layer is increased, and thus the bonding between the holding layer and the pad layer can be further strengthened. In addition, the rigidity of the holding layer can be improved by a convex portion or a concave portion.

In addition, in the description of the embodiment, the holding layer is formed of metal, but the present invention is not limited thereto. For example, the holding layer may be formed of a resin molded product. When the holding layer is formed of a resin molded product as described above, even the holding layer having a complex shape as shown in FIG. 3 can be easily and reliably manufactured.

In addition, when the holding layer is formed of a resin molded product, the shape thereof may be a hemispherical shape, a conical shape, or a bowl shape.

That is, when the holding layer is formed by resin molding, these shapes or a combination thereof can be easily manufactured, and the design thereof can be appropriately changed into a structure suitable for the user.

In addition, a surface of the holding layer formed of a resin molded product to which the pad layer is bonded may be formed of metal. As described above, the pad layer formed of polyurethane foam has high bond strength with metal. Therefore, by forming a metal plate or the like on a part or the entire portion of the surface of the holding layer formed of a resin molded product to which the pad layer is bonded, the bond strength between the holding layer and the pad layer can be improved. In this case, the metal may be embedded such that the front surface of the holding layer is covered with the metal plate, such that the metal plate is disposed on a part of the front surface of the holding layer, or such that a part of the holding layer is exposed.

Figure 4:
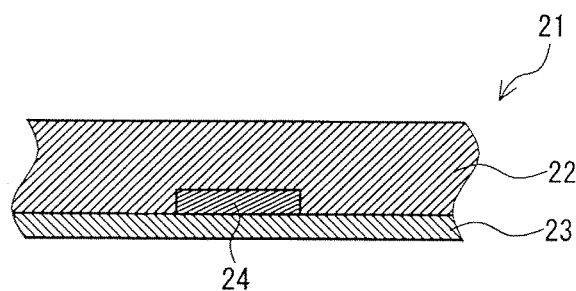
FIG. 4 is a cross-sectional view showing a drum pad according to still another embodiment of the present invention.

In the description of the above-described embodiment, the sensor 4 is attached to the back surface of the holding layer 3. However, as shown in FIG. 4, a sensor 24 may be disposed inside a pad layer 22. In the drum pad 21 of FIG. 4, the sensor 24 is disposed on the front surface of a holding layer 23, and the pad layer 22 covers the sensor 24 and the front surface of the holding layer 23. That is, the pad layer 22 covers a region of the front surface of the holding layer 23 where the sensor 24 is not disposed. In the region where the sensor 24 is not present, other layers are not present between the holding layer 23 and the pad layer 22, and the pad layer 22 is directly laminated on the front surface of the holding layer 23.

The plurality of sensors may be disposed on the back surface or the front surface of the holding layer. For example, one sensor may be disposed inside the pad layer, and other sensors may be disposed on the back surface of the holding layer. In addition, the sensor may be disposed not only in the center of the holding layer but also in the outer peripheral portion thereof.

In addition, this electronic percussion pad may further include a front surface material which is disposed on the striking surface of the pad layer. This front surface material may be formed of, for example, fabric such as knitted fabric. The front surface material may be integrated with the pad layer by laying the front surface material in advance in the molding dies, to which the polyurethane foam composition is to be supplied as described above, by supplying the polyurethane foam composition to the molding dies, and by allowing the polyurethane foam composition to foam and be cured.

EXAMPLE

Example 1

As a holding layer, a galvanized steel sheet having a thickness of 0.8 mm was used, and a polyurethane foam composition was allowed to foam and be cured on the front surface of the holding layer. As a result, a pad layer was laminated on the front surface of the holding layer, and a drum pad of Example 1 was obtained. The average thickness of the pad layer was 15 mm.

In Example 1, a polyurethane foam composition containing 25 parts by mass of an isocyanate component, 0.5 parts by mass of a foaming agent, 0.5 parts by mass of a catalyst, and 1 part by mass of a foam stabilizer with respect to 100 parts by mass of a polyol component was used. As the polyol component, PTMG 2000 (manufactured by Mitsubishi Chemical Corporation) was used. As the isocyanate component, carbodiimide modified MDI (manufactured by BASF INOAC Polyurethanes Ltd.) was used. As the foaming agent, water was used. As the catalyst, triethylenediamine was used. As the foam stabilizer, a silicon-based foam stabilizer was used.

In Example 1, the molding dies into which the polyurethane foam composition was put were closed with the holding layer as a cover, and the polyurethane foam composition was allowed to foam and be cured in the molding dies at a temperature of 55° C. for 30 minutes. Here, the polyurethane foam composition was put into the molding dies such that it free-foamed in an amount approximately 1.5 times to 2 times the volume of the molding dies. Specifically, 250 cc of the polyurethane foam composition was put into the molding dies having a volume of 615 cc. When the polyurethane foam composition free-foams, the volume expands to 4 times, that is, 1000 cc. However, since the polyurethane foam composition was allowed to foam and be cured in the molding dies as described above, the volume did not expand to greater than 615 cc. Therefore, the expansion ratio of the pad layer was calculated as 1000 cc/615 cc, or 1.62 times.

This expansion ratio can be adjusted by adjusting the amount of water as the foaming agent. For example, the expansion ratio can be adjusted to 6 times by adjusting the amount of water. In addition, the polyurethane foam composition did not expand to greater than 615 cc, but the non-expanding volume contributed to a foam pressure. Here, this foam pressure was 1.2 kgf7 cm$^2$ to 5.5 kgf/cm$^2$. The porosity of the pad layer was 0.45, and the Asker C hardness of the pad layer was 40.

Comparative Example 1

A drum pad of Comparative Example 1 was obtained with the same method as that of Example 1, except that the pad layer is formed of foaming silicon.

In Comparative Example 1, as a foaming silicone composition, a RTV two-liquid rubber was used. Specifically, KE521 (manufactured by Shin-Etsu Chemical Co., Ltd.) was used, in which 100 parts by mass of a curing agent (B agent) was mixed with 100 parts by mass of a main agent (A agent). The molding dies (volume: 615 cc) into which 330 cc of the polyurethane foam composition was put were closed with the holding layer as a cover as in Example 1, and a silicon composition was allowed to foam and be cured in the molding dies at a temperature of 55° C. for 30 minutes. When the foaming silicon composition free-foams, the volume expands to 3 times, that is, 990 cc. However, since the foaming silicon composition was allowed to foam and be cured in the molding dies as described above, the volume did not expand to greater than 615 cc. Therefore, the expansion ratio of the pad layer was calculated as 990 cc/615 cc, or 1.61 times.

[Peel Strength Test]

The peel strength values of Example 1 and Comparative Example 1 were measured according to JIS K 6854-1. Specifically, a pair of notches were formed on the pad layer at an interval of 25 mm. A portion between the pair of notches was pulled 60 mm in a 90° direction using a push-pull gauge. At this time, the maximum load was set as the peel strength.

The peel strength was measured at four positions regarding each of Example 1 and Comparative Example 1, and the average value thereof was calculated. The average value of Example 1 was 8.825 N/25 mm, and the average value of Comparative Example 1 was 4.275 N/25 mm. In this way, in Comparative Example 1, the bonding between the holding layer and the pad layer was insufficient; on the other hand, in Example 1, the bonding between the holding layer and the pad layer was strong.

Comparative Example 2

In a drum pad of Example 2, a surface of the pad layer to which the holding layer was bonded was formed as a composite layer as disclosed in Japanese Unexamined Patent Application, First Publication No. 2010-262167. This pad layer was formed with substantially the same method as that of Comparative Example 1 except that the foaming silicon composition was allowed to foam and be cured in a state where non-woven fabric forming a composite layer was disposed in the molding dies without disposing the holding layer therein. The pad layer was bonded to the holding layer having the same configuration as Comparative Example 1 through an adhesive layer. As the non-woven fabric forming the composite layer, non-woven fabric in which an adhesive layer was provided was used. Specifically, HIMELON HN620B (provided with an adhesive; manufactured by AMBIC Co Ltd.) was used.

[Sensitivity Test]

Regarding Example 1 and Comparative Example 2, a front surface material was provided to the striking surface of the pad layer, a sensor was attached to the back surface of the holding layer, and a sensitivity test was performed as described below using a striking apparatus. As the sensor, a disk-shaped piezoelectric sensor was used. This sensor was attached to the back surface of the holding layer through a spacer.

The striking apparatus has a rotation mechanism in which a drum stick having a diameter of about 14.4 mm and a length of about 407 mm rotates around a position at a distance of 25 mm from a grip-side end portion of the drum stick. The drum pad, which is a test target, is horizontally arranged in the striking apparatus such that, when an angle between the drum stick and a horizontal plane is −10°, a distal end of the drum stick comes into contact with the front surface of the drum pad.

(Strong Strike Test)

Figure 5:
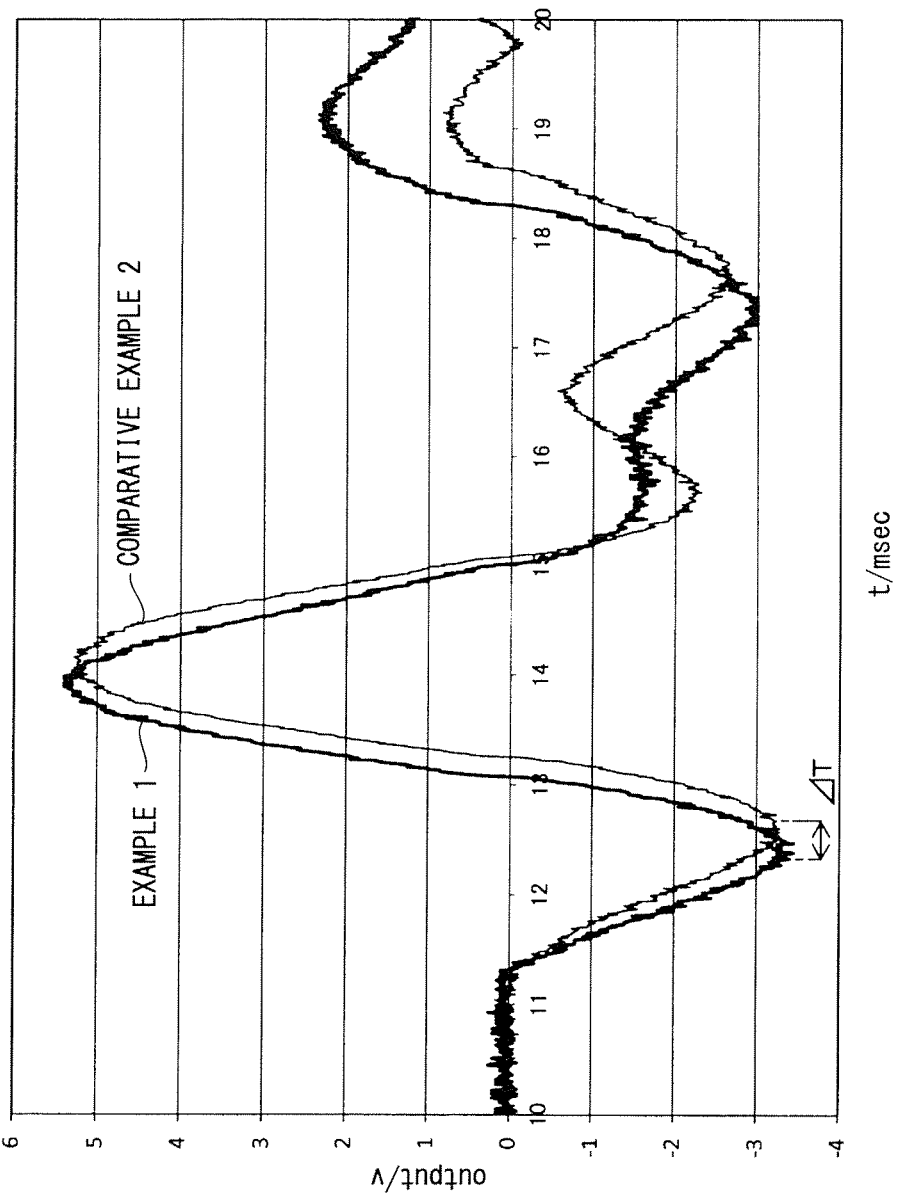
FIG. 5 is a graph showing the results of a striking test under a strong strike condition of drum pads as an example of the present invention and a comparative example.

By rotating with a rubber force at an angle of 90° to the drum pad (horizontal plane), the drum stick struck the drum pads of Example 1 and Comparative Example 2 under conditions that an angle of the distal end of the stick was −10° and the striking speed was 20 m/sec. FIG. 5 shows a change over time in the output of the sensor at that time. It was found from FIG. 5 that, in Example 1 in which non-woven fabric was not present in the holding layer, vibration transmission from a struck portion was faster (refer to ΔT of FIG. 5). The striking time was recognized from the time when the stick came into contact with the striking surface, that is, the time when the angle of the stick was 10°.

(Medium Strike Test)

Figure 6:
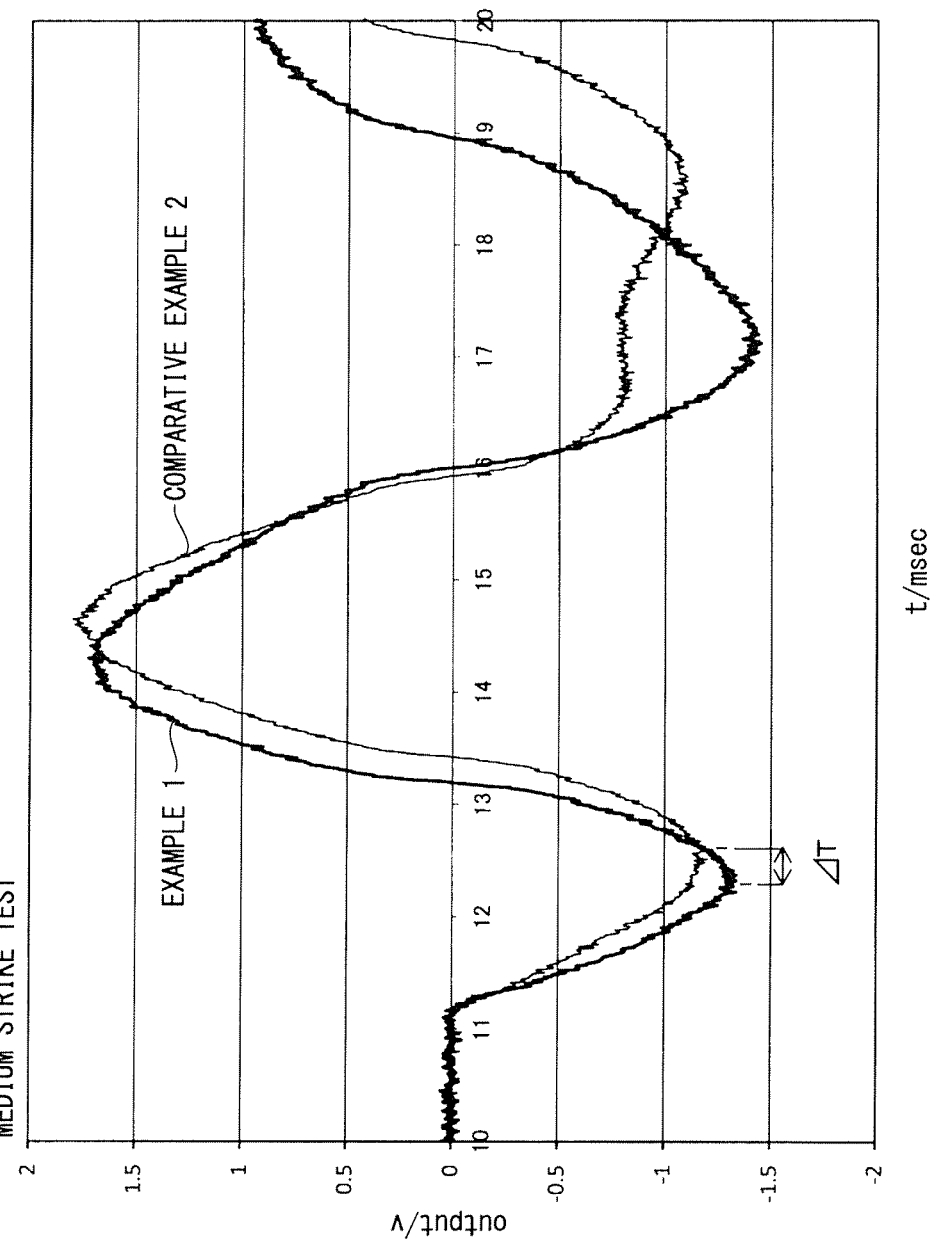
FIG. 6 is a graph showing the results of a striking test under a medium strike condition of drum pads as the example of the present invention and the comparative example.

By free-falling at an angle of 90° with respect to the drum pad (horizontal plane), the drum stick struck the drum pads of Example 1 and Comparative Example 2 under conditions that the angle of the distal end of the stick was −10°. FIG. 6 shows a change over time in the output of the sensor at that time. It was found from FIG. 6 that, in Example 1 in which non-woven fabric was not present in the holding layer, vibration transmission from a struck portion was faster (refer to ΔT of FIG. 6). The striking time was recognized from the time when the stick came into contact with the striking surface, that is, the time when the angle of the stick was −10°.

(Weak Strike Test)

Figure 7:
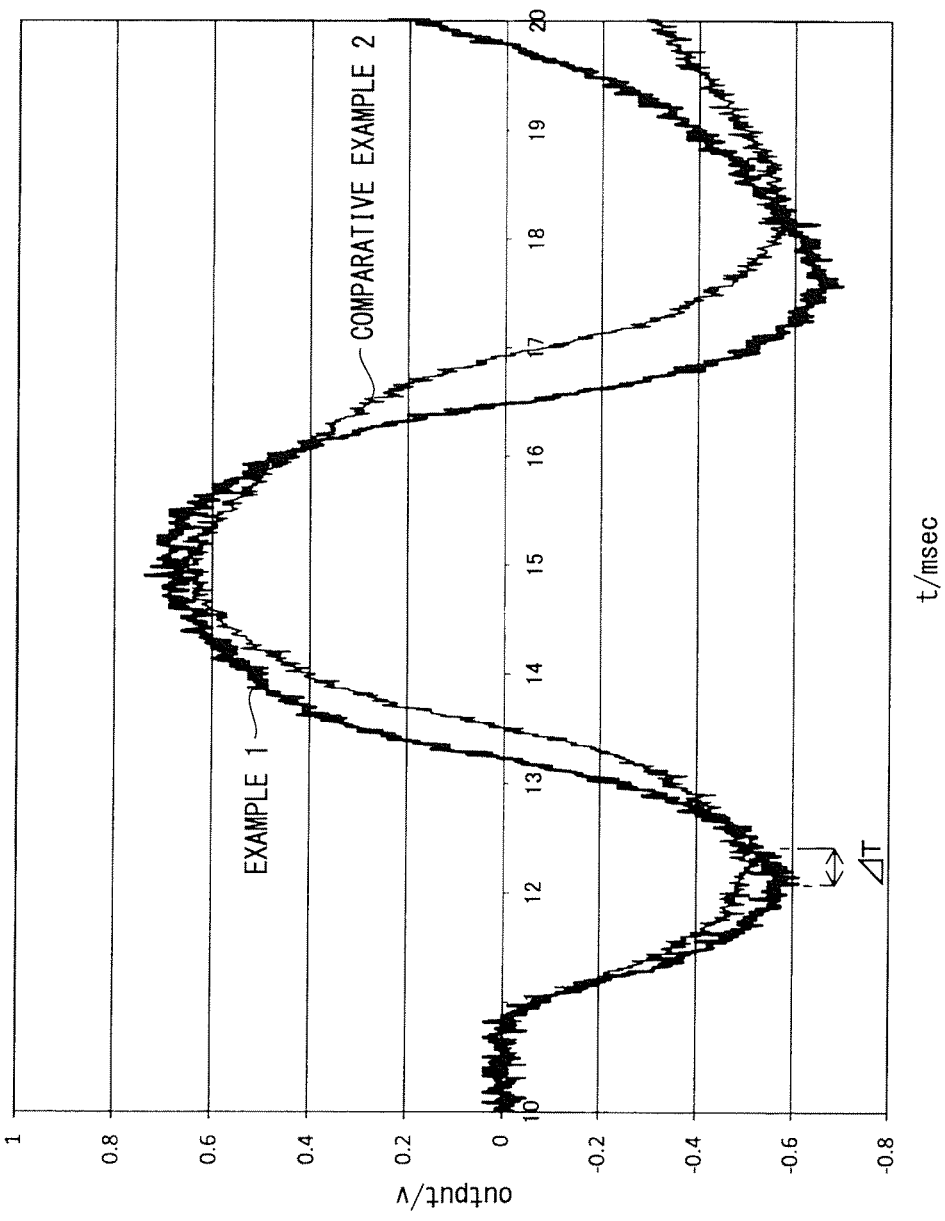
FIG. 7 is a graph showing the results of a striking test under a weak strike condition of drum pads as the example of the present invention and the comparative example.

By free-falling at an angle of 10° to the drum pad (horizontal plane), the drum stick struck the drum pads of Example 1 and Comparative Example 2 under conditions that an angle of the distal end of the stick was −10°. FIG. 7 shows a change over time in the output of the sensor at that time. It was found from FIG. 7 that, in Example 1 in which non-woven fabric was not present in the holding layer, vibration transmission from a struck portion was faster (refer to ΔT of FIG. 7). The striking time was recognized from the time when the stick came into contact with the striking surface, that is, the time when the angle of the stick was −10°.

As described above, with the electronic percussion pad according to the present invention, a satisfactory bonding state between the pad layer and the holding layer can be easily and reliably obtained, and the sensitivity of the attached sensor can be improved. Therefore, this electronic percussion pad can be desirably used in electronic percussion instruments such as electronic drums.

While preferred embodiments of the invention have been described and shown above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. An electronic percussion pad comprising:
a pad layer that includes a striking surface on a front surface of the pad layer; and
a holding layer that holds a back surface of the pad layer,
wherein the pad layer is formed of polyurethane foam laminated on a front surface of the holding layer, and at least a surface of the holding layer on which the polyurethane foam is laminated is formed of metal.

2. The electronic percussion pad according to claim 1, wherein the holding layer and the pad layer are directly laminated.

3. The electronic percussion pad according to claim 2, wherein the holding layer includes a plate-like holding layer main body and a convex portion or a concave portion that protrudes from the holding layer main body toward the front surface of the holding layer.

4. The electronic percussion pad according to claim 1, wherein the holding layer includes a plate-like holding layer main body and a convex portion or a concave portion that protrudes from the holding layer main body toward the front surface of the holding layer.

5. The electronic percussion pad according to claim 1, wherein a porosity of the pad layer is 30% to 80%.

6. The electronic percussion pad according to claim 1, wherein an Asker hardness of the pad layer is 10 to 60.

7. An electronic percussion pad comprising:
a pad layer that includes a striking surface on a front surface of the pad layer; and
a holding layer that holds a back surface of the pad layer, wherein the pad layer is formed of polyurethane foam laminated on a front surface of the holding layer, and a porosity of the pad layer is 30% to 80%.

8. The electronic percussion pad according to claim 7, wherein at least a surface of the holding layer on which the polyurethane foam is laminated is formed of metal.

9. An electronic percussion pad comprising:
a pad layer that includes a striking surface on a front surface of the pad layer; and
a holding layer that holds a back surface of the pad layer, wherein the pad layer is formed of polyurethane foam laminated on a front surface of the holding layer, and an Asker hardness of the pad layer is 10 to 60.

10. The electronic percussion pad according to claim 9, wherein at least a surface of the holding layer on which the polyurethane foam is laminated is formed of metal.

11. A method of manufacturing an electronic percussion pad, the method comprising:
supplying a polyurethane foam composition to molding dies disposed on one surface of a holding layer;
sealing the molding dies; and
forming a pad layer, which is bonded to the holding layer, by causing the polyurethane foam composition to foam so as to expand and be cured in the sealed molding dies.

12. The method of manufacturing an electronic percussion pad according to claim 11, wherein the polyurethane foam composition foams in the molding dies with a foam pressure of 1.2 kgf/cm² to 5.5 kgf/cm².

13. The method of manufacturing an electronic percussion pad according to claim 11, wherein the polyurethane foam composition foams in the molding dies with an expansion ratio of 1.2 times to 5.5 times.

14. The method of manufacturing an electronic percussion pad according to claim 11, further comprising attaching a sensor, which detects a strike on the pad layer, to a back surface of the holding layer.

15. The method of manufacturing an electronic percussion pad according to claim 11, further comprising providing a front surface material on a front surface of the pad layer.

16. The method of manufacturing an electronic percussion pad according to claim 12, further comprising attaching a sensor, which detects a strike on the pad layer, to a back surface of the holding layer.

17. The method of manufacturing an electronic percussion pad according claim 13, further comprising attaching a sensor, which detects a strike on the pad layer, to a back surface of the holding layer.

18. The method of manufacturing an electronic percussion pad according to claim 12, further comprising providing a front surface material on a front surface of the pad layer.

19. The method of manufacturing an electronic percussion pad according to claim 13, further comprising providing a front surface material on a front surface of the pad layer.

* * * * *